Figure 1:
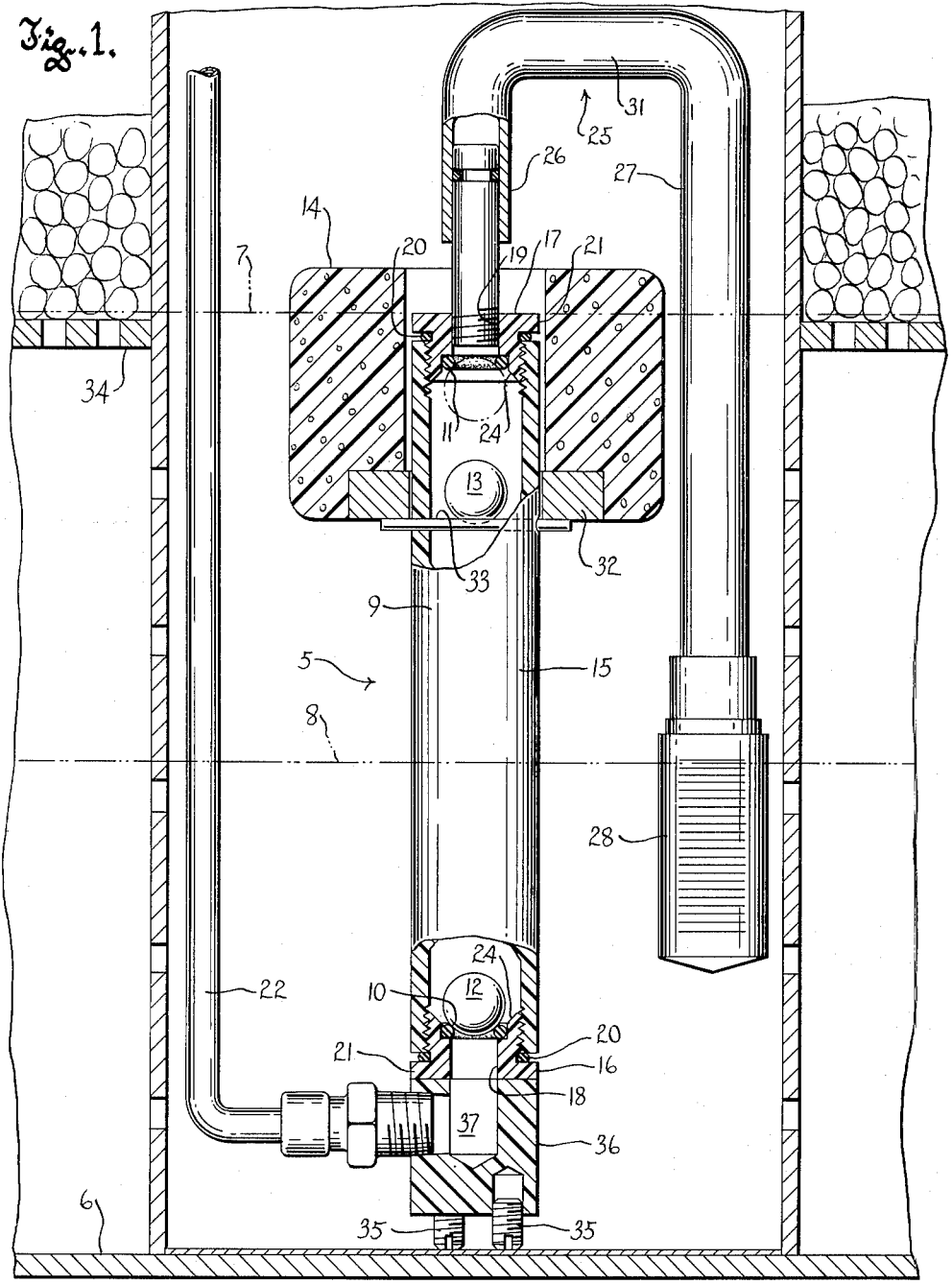

Aug. 24, 1965    J. RUDELICK    3,202,174
FLOAT ACTUATED FILL VALVE
Filed April 25, 1963    2 Sheets-Sheet 2

Inventor
John Rudelick

United States Patent Office 3,202,174
Patented Aug. 24, 1965

3,202,174
FLOAT ACTUATED FILL VALVE
John Rudelick, Milwaukee, Wis., assignor to Bruner Corporation, Milwaukee, Wis., a corporation of Wisconsin
Filed Apr. 25, 1963, Ser. No. 275,571
4 Claims. (Cl. 137—432)

This invention relates to fill valves of the float actuated type by which flow of liquid into a vessel can be terminated when liquid in the vessel reaches a predetermined level; and the invention refers more particularly to a valve mechanism by which liquid in a vessel can be prevented from falling below a predetermined low level as well as from rising above a predetermined high level, and which is therefore particularly useful as a brine valve for automatic water softeners.

In many automatic water softeners fresh water is filled into a brine forming vessel during a period near the conclusion of each regeneration cycle and until liquid in the vessel reaches a predetermined high level, whereupon a float actuated valve terminates flow of water into the vessel. The water remains in the vessel, in contact with a store of salt therein, to form brine which is withdrawn from the vessel and utilized in the next regeneration cycle. Brine withdrawal usually takes place through the same valve mechanism that controls flow of fresh water into the vessel, and is often effected by means of an eductor which continues to exert suction even after the required supply of brine has been drawn out of the vessel. Hence, if it is not desired to have air enter the system during the regeneration cycle, the fill valve mechanism must include a valve element that closes to prevent further brine withdrawal after liquid in the vessel reaches a predetermined low level that is above the level of the port into which brine is drawn from the vessel.

An example of a fill valve of the character described is disclosed and claimed in my copending application, Serial No. 98,250, filed March 24, 1961 (now Patent No. 3,095,008). That valve mechanism comprises a valve body adapted to be installed near the bottom of a brine vessel or the like and having a hollow interior into the lower portion of which an inlet passage opens and from which an outlet passage opens upwardly. The outlet passage is annular, its inner circumference being defined by a spool-like member fixed to the lower end of an axially movable stem that projects a substantial distance above the valve body and serves as a guide for an annular float. The float has a lost motion connection with the stem, provided by a collar fixed on the upper portion of the stem and which the float engages in the course of upward movement along the stem. When liquid in a vessel in which the mechanism is mounted reaches a predetermined high level, the float, acting through said collar, carries the stem upwardly. An annular valve element on the spool-like member at the bottom of the stem is thereby carried up into engagement with a valve seat at the bottom of the annular outlet passage to block further flow of liquid from the valve body into the vessel. When suction is manifested in the inlet passage in the valve body, such suction draws the valve element downwardly out of engagement with said seat, against the buoyant force exerted by the float, and liquid can then flow out of the vessel through the valve body. When liquid in the vessel reaches a predetermined low level, another annular valve element, mounted on the bottom of the float, engages an upwardly facing valve seat at the top of the annular outlet passage to prevent further withdrawal of liquid from the vessel to the point where air might enter the valve body.

From the foregoing brief description of the valve apparatus of Patent No. 3,095,008 it will be apparent to those skilled in the art that such a mechanism is not without its problems, although it has in fact proven to be very satisfactory in operation. For one thing, special valve elements are required for cooperation with the seats in the annular outlet passageway, since each of those valve elements must be capable of concurrent engagement with both the inner and the outer circumferential surfaces of its seat; and this requirement is complicated by the fact that the inner circumferential seat surface is formed on a member that is movable up and down relative to the valve body.

Another disadvantage of the valve mechanism of Patent No. 3,095,008 is that it is not well adapted for the dry salt platform type of briner that is coming into widespread use in automatic water softeners. With such a briner the brine vessel must always be filled to a predetermined high level, slightly above a foraminous platform on which a store of salt is supported and which is spaced above the bottom of the brine vessel, and therefore regulation of the valume of brine withdrawn at each regeneration can only be effected by adjustment of the low level to which liquid in the vessel can be drawn. It will be apparent that the low level to which liquid is withdrawn through the valve mechanism just described is not readily adjustable; and hence the volume of brine draw-off can only be controlled by adjusting the height of the collar on the stem, to vary the high level to which the float can rise before filling of the vessel is terminated.

With the foregoing in mind, it is a major object of the present invention to provide a fill valve mechanism of the character described, capable of stopping filling of a vessel when liquid therein reaches a predetermined high level, and of stopping withdrawal of liquid from a vessel when liquid therein reaches an adjustably variable low level, and which valve mechanism features valve elements of very simple type, such as ordinary ball valves.

In this connection it is also an object of this invention to provide a float actuated fill valve of the character described that is comprised of relatively few and simple parts, most of which are well adapted to be molded of plastic material, so that the valve of this invention lends itself to fast, inexpensive, high volume production with a minimum of machine tools and other production equipment.

Another object of this invention is to provide a float actuated valve wherein there is no tangible physical connection between the float which actuates the valve and the valve element controlled by the float, thus eliminating all of the difficulties that may arise from the necessity for a mechanical connection between the float and the valve element.

Still another object of this invention is to provide a valve mechanism of the character described having a body, a float actuator externally of the body and movable up and down relative thereto, and a valve element movable up and down in the body to and from a closed position engaging a downwardly facing seat in the body, wherein there is a magnetic connection between the float and the valve element whereby the valve element is constrained to move to and from engagement with its seat in unison with up and down movement of the float.

It is also an object of this invention to provide a valve mechanism of the character described having a valve body with a pair of movable valve elements therein, one of said valve elements being float actuated for termination of filling of a vessel in which the mechanism is installed when liquid in the vessel reaches a predetermined high level, and the other of said valve elements being buoyant and performing the dual function of terminating withdrawal of liquid from the vessel when liquid therein reaches a predetermined low level and of serving as a flow restrictor during filling of the vessel.

A further object of this invention is to provide a valve mechanism in which all of the above mentioned objects are attained and which is at the same time very compact so as to be well adapted for installation in the limited space available in the briner of an automatic water softener.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

Figure 2:
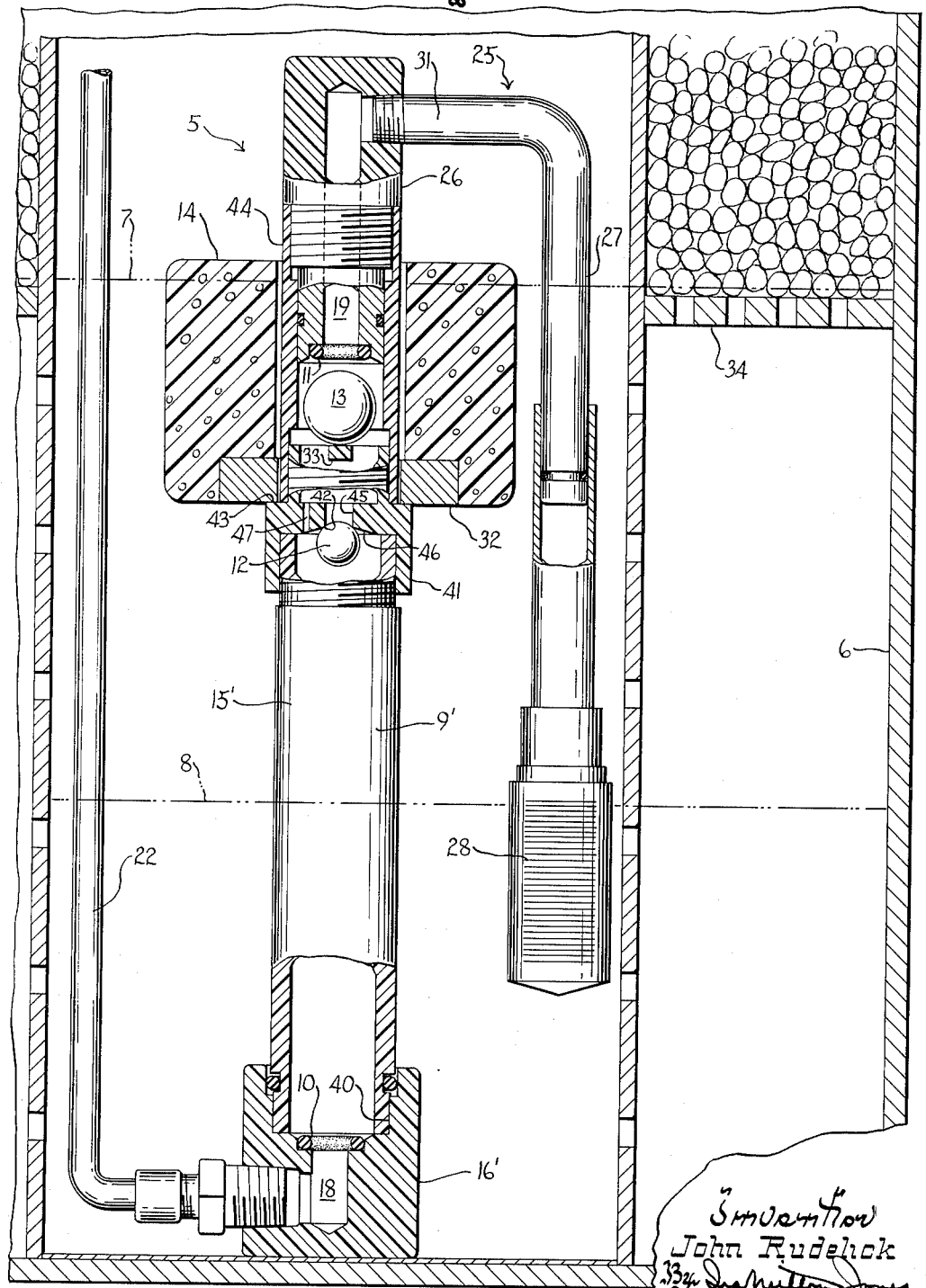

The accompanying drawings illustrate two complete examples of the physical embodiments of the invention constructed according to the best mode so far devised for the practical application of the principles thereof, and in which:

FIGURE 1 is a vertical sectional view of a valve mechanism of this invention installed in a vessel (such as a water softener brine tank) in which liquid is to be maintained between predetermined high and low levels; and FIGURE 2 is a vertical sectional view of a modified embodiment of the valve mechanism of this invention.

Referring now more particularly to the accompanying drawings, the numeral 5 designates generally a fill valve mechanism embodying the principles of this invention and which is adapted to be installed in a brine tank 6 or similar vessel, for controlling filling of the vessel to a predetermined high liquid level, designated by the broken line 7, and withdrawal of liquid from the vessel to a predetermined low level denoted by the broken line 8.

In general the valve mechanism 5 comprises an upright hollow body 9 having an upwardly facing annular valve seat 10 near its bottom and a downwardly facing annular valve seat 11 near its top, a buoyant valve element 12 cooperable with the lower valve seat 10, a non-buoyant valve element 13 cooperable with the upper valve seat 11, and an annular float 14 surrounding the body to be guided thereby for up and down motion.

The valve body 9 can be readily formed in three parts, consisting of a straight, tubular main member 15 and lower and upper annular end members 16 and 17, which can be identical with one another and which are threaded or otherwise secured in the lower and upper end portions of the tubular body member 15. Since the valve body must be of non-magnetic material, the tubular main member 15 can be readily and inexpensively formed of plastic tube stock, which has the further advantage of not being susceptible to corrosion by fresh water and brine. The end members 16 and 17 can likewise be made of plastic. The lower and upper valve seats 10 and 11 are formed on the inner faces of the annular end members 16 and 17, coaxially with the bores 18 and 19 in those members, which provide top and bottom ports in the valve body.

A suitable gasket 20 provides a seal between each end member and the tubular body member 15, such gasket being illustrated as an O-ring which embraces the end member and which is axially confined between a radially outwardly projecting circumferential flange 21 on the end member and the adjacent end of the tubular body member 15. A threaded connection between the end member and the tubular body member, as shown in FIGURE 1 insures that the gasket can easily be compressively confined in good sealing engagement with both members.

The two valve elements 12 and 13 can be spherical, and their seats 10 and 11 can comprise O-rings, each confined in a groove coaxially surrounding the bore or port in its end member. Preferably each end member has a frustoconical surface 24 that surrounds and converges toward the valve seat, by which the cooperating valve element can be guided onto the seat as it is moved toward the same in the manner described hereinafter.

The bottom port 18 in the valve body is connected with a duct 22 that may be communicated, at different times, with a source of suction, when liquid is to be withdrawn from the vessel, and with a source of liquid under pressure to be filled into the vessel. When the duct 22 is subjected to suction, the lower valve element 12 engages its seat 10 just before liquid in the interior of the valve body reaches the level of said seat, thus preventing the entry of air into the duct 22. When liquid in the interior of the valve body is at a higher level, the valve element 12 is held off of its seat 10 by its own buoyancy, and liquid can flow in either direction through the bottom port 18.

Communication between the hollow interior of the valve body and the interior of the vessel 6 is through an inverted U-shaped siphon duct 25 having one leg 26 connected to the top port 19 in the valve body and its other leg 27 terminating in a screened mouth or outlet 28. It will be apparent that liquid can be drawn out of the vessel 6, through the valve mechanism, to a level determined by the elevation of the mouth 28 of the siphon duct, which can be disposed anywhere below the level of the upper valve seat 11, without regard to the level of the lower valve seat 10. Hence the volume of brine or other liquid taken from the vessel 6 at each withdrawal can be regulated within a wide range of values by adjusting the height at which the mouth 28 is located, and for this purpose one of the legs of the siphon duct comprises a pair of telescopingly adjustable members. In FIGURE 1 the adjustably telescoping elements are shown as comprising the shorter leg 26 of the siphon duct, while in FIGURE 2 they are shown as comprising its longer leg 27. As an alternative which will be obvious to those skilled in the art, the longer leg 27, or even the entire siphon duct, could be made as a flexible hose, the mouth of which could be suitably supported at any desired height to provide adjustment of the desired minimum liquid level.

The bight portion 31 of the siphon duct must be high enough above the valve body so that it clears the annular float 14 when the latter is in the highest position to which it normally rises.

The valve element 13 that cooperates with the upper valve seat 11 comprises a magnetically permeable member and is preferably a steel ball, although it could be made in some shape other than spherical and could either be made entirely of magnetically permeable material or could be made as a body of non-magnetic material with a piece of magnetically permeable material embedded in it.

Attention is directed to the fact that there is no tangible physical connection between the annular float 14 and the upper non-buoyant valve element 13. Instead, the upper valve element is constrained to move up and down with the float by means of a magnetic connection comprising a magnetically permeable member 32 on the float which cooperates with the magnetically permeable member comprising the valve element 13. One of said magnetically permeable members (and it can be either the float carried member 32 or the valve element 13) must of course be a permanent magnet, while the other can be of soft iron or other permeable material which does not retain magnetism, although it will be apparent that both of them could be permanent magnets since both are free to rotate so that their unlike poles will automatically swing into proximity for the maximum magnetic coupling between them. The float carried member 32 can suitably comprise, as shown, a ring magnet secured, as by means of a suitable adhesive to the underside of the float.

When the vessel 6 contains liquid only up to the low level designated by the line 8, so that the float is well below the level of the upper valve seat 11, the magnetically responsive upper valve element can be supported by a stop 33 in the valve body which is spaced below the upper valve seat and which can be a transverse pin fixed in the mid-portion of the tubular body member 15. If desired, the end portions of the pin 33 can project outside the tubular body member 9, as shown, to provide a support upon which the float rests when liquid in the vessel descends to lower levels.

When liquid under pressure is introduced into the duct 22, the lower valve element 12, because of its buoyancy, engages the stop 33 as liquid in the valve body rises toward the upper valve seat 11. The upper valve element 13, because of its greater weight, tends to remain on the stop as the liquid flows upwardly past it through the interior of the valve body 9, but the stop should of course be spaced below the upper valve seat 11 by a great enough distance to insure that the force of the upwarlly flowing liquid will not carry the upper valve element into engagement with said seat.

As the level of liquid in the vessel, outside the valve body, rises above the stop 33, the upper valve element 13 is carried upwardly by the rising float, owing to its magnetic coupling therewith, until the float reaches a height at which the valve element 13 engages its seat 11, blocking further flow of liquid into the vessel.

When suction is manifested in the duct 22, as for withdrawal of brine from the vessel to regenerate a water softener, such suction overcomes the buoyant force upon the float 14 and/or the force of the magnetic connection between the float and the upper valve element 13, and draws the upper valve element downwardly off of its seat. Through the duct 25 liquid from the vessel is siphoned into the valve body 9, siphoning action being assured by the fact that the siphon duct remains filled with liquid from the previous filling of the vessel. As the liquid level in the vessel goes down, the float 14 descends correspondingly, and with it the upper valve element 13 until the latter engages the stop 33. Meanwhile the lower valve element 12 remains engaged with the stop 33 under the buoyant force exerted upon it by the liquid in the valve body. However, when liquid in the vessel falls below the level of the mouth 28 of the siphon duct 25, air enters said duct, breaking the siphon action, and shortly thereafter the level of liquid in the valve body 9 will fall, lowering the buoyant lower valve element onto its seat 10 before air can enter the duct 22.

As pointed out above, the volume of liquid taken from the vessel at each withdrawal can be easily regulated by adjustment of the height of the screened mouth 28 of the siphon duct 25, to thereby establish the minimum level 8 to which liquid can be drawn down. However, such adjustment does not change the maximum level 7 to which the valve will fill the vessel, said level being established by the height to which the float 14 must rise in order to carry the upper valve element 13 into engagement with its seat 11, and being thus determined by the height of that seat above the botom of the vessel. In briners of the dry salt platform type, the high liquid level 7 should be adjustable upon initial installation of the valve mechanism, to insure that the brine vessel is always filled to a level very slightly above that of the foraminous shelf or platform 34 upon which the salt store is supported, but should not thereafter be altered. With the valve mechanism of this invention the maximum level to which liquid can be filled into a vessel is controllable by adjustment of the elevation of the valve body above the bottom of the vessel. To facilitate such adjustment, the valve body may be provided with three downwardly projecting supporting legs 35, the lower ends of which rest on the bottom of the vessel 6 and the upper end portions of which are threaded into a block-like mounting member 36 that is cemented or otherwise secured to the bottom of the lower annular end member 16. The height of the upper valve seat can of course be adjusted by screwing the mounting legs 35 farther into or out of the block-like member 36.

The block-like member 36 can also provide a connection between the bottom port 18 and the duct 22, and has a passage 37 therein to communicate said duct with said port.

The embodiment of the invention illustrated in FIGURE 2 provides throttled flow of liquid into the vessel 6 during filling thereof, as is desirable in some water softener systems, but permits substantially unrestricted flow of liquid being withdrawn from the vessel.

Its valve body 9' comprises a straight length 15' of plastic tubing and a block-like bottom member 16' which provides the lower valve seat 10 and the bottom port 18 in the valve body and to which the duct 22 is connected. The bottom member may have a counterbore 40 therein in which the lower end portion of the plastic tube 15' is received and cemented. The upper end of the tube 15' is cemented or otherwise sealed to an annular flow restrictor member 41 which provides a coaxial downwardly facing valve seat 42 and which has a large enough outside diameter to provide an upwardly facing circumferential shoulder 43 upon which the float 14 rests when liquid in the vessel 6 is at low levels. Coaxially secured to the flow restrictor member at its upper side is an assembly 44 of tubular plastic elements that provides the upper downwardly facing valve seat 11, the top port 19 in the valve body, and the shorter leg 26 of the siphon duct 25.

The buoyancy of the lower valve element 12 yieldingly biases it into engagement with the downwardly facing seat 42 in the flow restrictor member 41 whenever liquid is present in the valve body 9' to the level of said seat, so that the valve element 12 cooperates with the flow restrictor member to act as a check valve, substantially preventing upward flow of liquid through the coaxial bore 45 in the flow restrictor member but permitting substantially unrestricted flow downwardly therethrough. A frustoconical lower surface 46 on the flow restrictor member, converging toward the valve seat 42, guides the buoyant valve element 12 into engagement with said seat. A small by-pass bore 47 in the flow restrictor member, spaced to one side of its main bore 45, provides for throttled upward flow through the flow restrictor member when the lower valve element 12 is seated thereagainst.

It will be noted that the buoyant valve element 12 need not make a perfect seal with the seat 42 in the flow restrictor member, since some flow of liquid through that member must take place even when the valve element is seated. Hence, instead of providing the by-pass passage 47, the necessary flow past the valve element 12 could obviously be obtained by other than a perfectly circular configuration of the seat 42, so that there would be, in effect, a controlled leakage past the buoyant valve element.

From the foregoing description taken together with the accompanying drawings it will be apparent that this invention provides a very simple, compact, inexpensive and sturdy fill valve mechanism, particularly well suited for the brine vessels of automatic water softeners, whereby flow of liquid into a vessel in which the valve is installed can be terminated when liquid in the vessel reaches a predetermined high level and withdrawal of liquid from the vessel can be terminated when liquid in the vessel reaches an adjustably predeterminable low level, and wherein there is a magnetic connection between a float and a valve element in the valve body, by which the valve element is moved toward and from its seat in unison with upward and downward movement of the float. It will also be apparent that the valve mechanism of this invention is especially well suited for briners of the dry salt platform type because simple means can be provided on it for readily adjusting the minimum level to which liquid is drawn out of a vessel through the valve, without changing the high level to which the vessel is filled through the valve.

What is claimed in my invention is:

1. Valve mechanism for controlling flow of liquid into and out of a vessel to stop filling of the vessel when liquid therein reaches a predetermined high level and to stop withdrawal from the vessel when liquid therein reaches a predetermined low level, said valve mechanism comprising:
  (A) an upright substantially tubular body having
    (1) ports at its top and bottom,
    (2) a downwardly facing annular valve seat in an upper portion of the body through which the interior of the body is communicable with the top port, and
    (3) an upwardly facing substantially coaxial annular valve seat in a lower portion of the body through which the interior of the body is communicable with the bottom port;
  (B) a buoyant valve element in the body engageable with said upwardly facing valve seat to close the same but adapted to be held out of contact with the upwardly facing valve seat by liquid in the body above a level near the upwardly facing valve seat;
  (C) a non-buoyant valve element in the body, engageable with the downwardly facing valve seat to block flow of liquid therethrough from the interior of the body to the top port, said nonbuoyant valve element comprising a magnetically permeable member;
  (D) an annular float surrounding the body to be guided thereby for up and down motion in response to changing levels of liquid in a vessel in which the valve mechanism is installed;
  (E) a second magnetically permeable member carried by said float for up and down movement in unison therewith, one of said magnetically permeable members being a permanent magnet whereby the non-buoyant valve element can be magnetically connected with the float for up and down movement in unison therewith to and from engagement with the downwardly facing valve seat; and
  (F) stop means fixed in the body intermediate said valve seats, engageable by the valve elements when out of their closed positions, said stop means being at a level at least as high as the lowest level to which the float can descend so that the magnetic connection between the float and the non-buoyant valve element always obtains as the float rises toward and reaches a level corresponding to said predetermined high level of liquid in the vessel.

2. The fill valve mechanism of claim 1, further characterized by:
  (A) an inverted U-shaped siphon duct having one leg communicated with the top port in the tubular body; and
  (B) means on the other leg of the siphon duct defining a mouth that communicates the interior of the siphon duct with the interior of a vessel in which the valve mechanism is installed, said last named means being adjustably variable as to height to thus provide for regulating the low level to which liquid in the vessel can be withdrawn through the valve mechanism.

3. A liquid level responsive valve mechanism of the type comprising a valve body having inlet and outlet ports and an inwardly facing annular valve seat between said ports, a valve element in the body movable toward and from a closed position engaging the valve seat to block flow of liquid from the inlet port to the outlet port, and a float mounted externally of the valve body and constrained to up and down motion relative thereto so as to be responsive to the level of liquid in a vessel in which the valve mechanism is mounted, said valve mechanism being characterized by the following:
  (A) the valve seat faces downwardly, and the valve element is movable upwardly to and downwardly from its closed position;
  (B) the valve element and the float each comprises a magnetically permeable member;
  (C) one of said magnetically permeable members is a permanent magnet, so that the valve element can be magnetically connected with the float through the valve body for up and down motion to and from its seat in unison with up and down motion of the float; and
  (D) upwardly facing stop means is fixed inside the valve body spaced below the valve seat to be engaged by the valve element when the same is out of its closed position, said stop means being at a level at least as high as the lowest level to which the float can descend so that the magnetic connection between the valve element and the float always obtains as the float rises toward and reaches the liquid level at which valve closure is to take place.

4. A liquid level responsive valve mechanism comprising:
  (A) an upright substantially tubular valve body having
    (1) a port opening from its top through a downwardly facing upper valve seat, and
    (2) another port opening from its bottom through a substantially coaxial upwardly facing lower valve seat;
  (B) a non-buoyant valve element in the valve body cooperable with the upper valve seat to close the same and comprising a magnetically permeable member;
  (C) an annular float surrounding the valve body to be guided thereby for up and down motion in accordance with variations in the level of liquid in a vessel containing the valve mechanism;
  (D) a second magnetically permeable member carried by the float for up and down motion therewith, one of said magnetically permeable members being a permanent magnet so that the non-buoyant valve element can be magnetically connected with the float for up and down movement in unison therewith to and from engagement with the upper valve seat;
  (E) a buoyant valve element in the valve body which tends to be forced upwardly by liquid in the body above a level near the lower valve seat and which is engageable with said seat to close the same when liquid in the valve body is at said level, to prevent withdrawal of liquid from the valve body to below said level; and
  (F) means in the valve body defining
    (1) an intermediate downwardly facing valve seat spaced from the upper and lower valve seats and which is engageable by the buoyant valve element when the same is forced upwardly by liquid in the valve body,
    (2) a restricted passage in bypass relation to said intermediate seat and which at all times provides communication between the upper and lower valve seats so that said last named means cooperates with the buoyant valve element to provide substantially throttled upward flow of liquid through the valve body while permitting substantially unrestricted downward flow therethrough, and
(3) said last named means also providing an upwardly facing stop upon which the non-buoyant valve element can rest when out of engagement with the upper valve seat and which is at a level at least as high as the lowest level to which the float can descend so that the magnetic connection between the float and the non-buoyant valve element always obtains as the float rises toward and reaches the liquid level at which the upper valve seat is to be closed.

References Cited by the Examiner

UNITED STATES PATENTS

| | | | |
|---|---|---|---|
| 2,597,952 | 5/57 | Rosenlund | 251—65 |
| 3,105,512 | 10/63 | Lyall et al. | 137—416 |

WILLIAM F. O'DEA, *Primary Examiner.*